3,043,654
TRANSPARENT FERROMAGNETIC MATERIAL AND METHOD FOR PRODUCING THE SAME
Lothar H. Brixner, West Chester, Pa., assignor to E. I. du Pont de Nemours and Company, Wilmington, Del., a corporation of Delaware
No Drawing. Filed Oct. 7, 1959, Ser. No. 844,842
10 Claims. (Cl. 23—50)

This invention relates to a transparent ferromagnetic crystalline material having the chemical formula $$Ca_2Fe_{10}O_{17}$$

and to methods for producing the same.

The objects of this invention are accomplished by reacting ferric oxide with a calcium halide selected from the group consisting of calcium chloride, calcium bromide, and calcium iodide. The reaction is carried out at elevated temperatures in the presence of an oxidizing gas such as oxygen, water vapor, or mixtures of these materials with non-reducing gases. (Air is an excellent example of such a mixture.)

In one embodiment of this invention, a powdered mixture of ferric oxide and calcium halide is fired in the presence of an oxiding gas. In another embodiment, the reaction is carried out by introducing ferric oxide into molten calcium halide while bubbling an oxidizing gas through the molten halide.

The reaction of this invention proceeds according to Equation I when oxygen is used, and according to Equation II when water vapor is used.

EQUATION I $$2CaX_2 + 5Fe_2O_3 + O_2 \rightarrow Ca_2Fe_{10}O_{17} + 2X_2$$

EQUATION II $$2CaX_2 + 5Fe_2O_3 + 2H_2O \rightarrow Ca_2Fe_{10}O_{17} + 4HX$$

where X is chlorine, bromine, or iodine. Reacting proportions are, of course, stoichiometric according to the above equations. If the firing technique is used, it is preferable to have stoichiometric proportions of calcium halide and ferric oxide according to the above equations. Amounts outside of the stoichiometric ratio can also be used, but large excesses of either reactant are preferably avoided since any unreacted material will contaminate the end product. The amount of oxygen or water vapor used is not critical provided there is a sufficient amount to enter into the reaction. The practical way of providing the oxygen or water vapor for the reaction is to carry out the firing in an atmosphere of either of these gases or of air. In the melt technique previously described, proportions are not especially critical so long as there is sufficient halide to act as the reaction medium and to keep the reaction mass fluid. Of course, there should also be sufficient oxygen or water vapor to bubble through the molten halide. The excess metal halide necessary to keep the reaction mass in a state of fluidity is between 2 and 3 times the stoichiometric quantity in accordance with the above equations. The excess halide can be readily removed by leaching after completion of the reaction.

Under the conditions described, the novel product of this invention, $Ca_2Fe_{10}O_{17}$, is obtained in the form of red, transparent, ferromagnetic, hexagonal platelets.

To illustrate more fully the method of preparation of the ferromagnetic product, the following example is given. This example is intended to be merely illustrative of the invention and is not to be held as in limitation thereof.

*Example*

$Fe_2O_3$ was reacted with $CaCl_2$ under the following conditions:

300 g. of anhydrous $CaCl_2$ was fused in a platinum dish. Through a perforated platinum tube reaching to the bottom of the dish, oxygen was bubbled. When the temperature of the melt reached 1250° C., 10 g. of $Fe_2O_3$ was introduced into the melt. While continuing to bubble oxygen through the melt, the crucible and melt were held at a temperature of 1250° C. for 3 hours and then the melt cooled. The reaction mixture was leached with water.

The reaction product obtained after leaching consisted of about equal parts of two distinctly different types of crystals:

(a) A portion of dark, red-brown, transparent, non-magnetic needles and rods, and (b) red, magnetic, transparent platelets.

The two products were readily separated magnetically. The product designated as (a) was analyzed and found to be $CaFe_2O_4$, a product previously described in the literature. Analytical results were:

CaO: 24.85% (Calc. 25.8%)
$Fe_2O_3$: 75.15% (Calc. 74.2%)

X-ray analysis gave the following crystal lattice measurements: $a_0 = 3.00$ A., $b_0 = 10.60$ A., $c_0 = 9.20$ A. The space group is $D_{2h}$.

The formation of these crystals would be accounted for by the following reaction:

$$2CaCl_2 + 2Fe_2O_3 + O_2 \rightarrow 2CaFe_2O_4 + 4Cl_2$$

The portion of the product designated as (b) above, was analyzed and found to be $Ca_2Fe_{10}O_{17}$. Analytical results were:

CaO: 13.57% (Calc. 12.5%)
$Fe_2O_3$: 86.26% (Calc. 87.5%)

X-ray analysis of the hexagonal single crystals gave the following lattice parameters: $a_0 = 6.01$ A.; $C_0 = 22.40$ A.

The density as measured by pycnometer and by X-ray was 4.10 g. cm.$^{-3}$ and 4.31 g. cm.$^{-3}$, respectively.

The electrical properties were determined to be as follows:

Saturation magnetization ($B_s$) ------ 142 gauss.
Specific saturation magnetization ($\sigma_s$) 10.36 ergs/gauss.
Remanent magnetization ($B_r$) ------ 9 gauss.
Coercive force ($iH_c$) -------------- <8.4 oersteds.

The exact coercive force of this sample could not be measured because it exceeded the lower limit of the capacity of the test apparatus.

Although a reaction temperature of 1250° C. was used in the above example, the reaction temperature may vary with changes in conditions of the process. If, for example, the halide salt used is calcium iodide, its lower melting point (575° C., compared with 772° C. for the chloride and 765° C. for the bromide) will allow the reaction to proceed at a somewhat lower temperature. In general, a temperature of from about 1100° C. to about 1300° C. is entirely suitable for carrying out the process of this invention. Similarly, the time required for the completion of the reaction will vary depending upon conditions of the reaction. The time for reaction will vary with the halide chosen, with changes in the ratio of ferric oxide to halide used, and with the rate of gas flow over or through the reactant mixture. A reaction time of from two to four hours is used under most conditions.

In contrast with the well known ferromagnetic "Ferroxdure," $BaFe_{12}O_{19}$, the novel product of this invention $Ca_2Fe_{10}O_{17}$ is a "soft" magnetic compound. Its optical properties indicate that the direction of easy magnetization is not parallel to the c-axis (as in "Ferroxdure") but lies in the basal plane.

The ferromagnetic material of this invention is valuable for modulation of light in various magneto-optical applications. More specifically, transparent $Ca_2Fe_{10}O_{17}$ can be used to convert electrical signals into optical signals, which may be transmitted. Transparent $Ca_2Fe_{10}O_{17}$ can furthermore be used for the storage and recording of information magnetically, which later on may be read out optically. This would be considerably more accurate than the presently used mechanical "read-out heads." Transparent $Ca_2Fe_{10}O_{17}$ can also be used as a shutter for polarized light and also to vary light intensity to any desired magnitude.

Since it is obvious that many changes and modifications can be made in the above-described details without departing from the nature and spirit of the invention, it is to be understood that the invention is not to be limited to said details except as set forth in the appended claims.

This case is a continuation-in-part of my copending application Serial No. 744,818, filed June 26, 1958, now abandoned.

I claim:

1. A process for the production of red, transparent, ferromagnetic, hexagonal platelets of $Ca_2Fe_{10}O_{17}$ consisting of reacting at elevated temperatures ferric oxide and a calcium halide selected from the group consisting of calcium chloride, calcium bromide, and calcium iodide in the presence of an oxidizing gas.

2. The process of claim 1 in which the oxidizing gas is oxygen.

3. The process of claim 1 in which the oxidizing gas is water vapor.

4. A process for the production of red, transparent, ferromagnetic, hexagonal platelets of $Ca_2Fe_{10}O_{17}$ consisting of introducing ferric oxide into a molten calcium halide selected from the group consisting of calcium chloride, calcium bromide, and calcium iodide, while bubbling an oxidizing gas through said melt.

5. The process of claim 4 in which the oxidizing gas is oxygen.

6. The process of claim 4 in which the oxidizing gas is water vapor.

7. A process for the production of red, transparent ferromagnetic, hexagonal platelets of $Ca_2Fe_{10}O_{17}$ consisting of firing a powdered mixture of ferric oxide and a calcium halide selected from the group consisting of calcium chloride, calcium bromide, and calcium iodide, in the presence of an oxidizing gas.

8. The process of claim 7 in which the oxidizing gas is oxygen.

9. The process of claim 7 in which the oxidizing gas is water vapor.

10. Red, transparent ferromagnetic, hexagonal platelets of $Ca_2Fe_{10}O_{17}$.

References Cited in the file of this patent

Mellor: "Comprehensive Treatise on Inorganic and Theoretical Chemistry," Longmans, Green & Co., New York, vol. 13, Pt. II, pages 910 to 913 (1934).

Hoffman: Lexikon Der Anorganischen Verbindunger, Band II, AL–X, No. 56–81, 1912–1914, page 182.